United States Patent
Ando

(10) Patent No.: US 9,013,849 B2
(45) Date of Patent: Apr. 21, 2015

(54) GROUND PROTECTION CIRCUIT AND SWITCH DRIVING DEVICE USING THE SAME

(75) Inventor: Motohiro Ando, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 318 days.

(21) Appl. No.: 13/401,242

(22) Filed: Feb. 21, 2012

(65) Prior Publication Data

US 2012/0212863 A1 Aug. 23, 2012

(30) Foreign Application Priority Data

Feb. 22, 2011 (JP) ................................ 2011-035325

(51) Int. Cl.
| | |
|---|---|
| H02H 3/02 | (2006.01) |
| H02H 7/22 | (2006.01) |
| H02H 3/087 | (2006.01) |
| H02H 7/20 | (2006.01) |

(52) U.S. Cl.
CPC ............... *H02H 7/222* (2013.01); *H02H 3/087* (2013.01); *H02H 7/20* (2013.01)

(58) Field of Classification Search
CPC ... H03K 17/0822; H03K 3/087; H03K 3/006; H03K 17/0828; H03F 1/52; H02H 7/222; H02H 7/20

USPC .......................................................... 361/93.7
See application file for complete search history.

(56) References Cited

U.S. PATENT DOCUMENTS

| | | | | |
|---|---|---|---|---|
| 7,023,191 | B2 * | 4/2006 | Bernacchia et al. | 323/282 |
| 7,737,773 | B2 * | 6/2010 | Kanamori et al. | 327/589 |
| 7,960,997 | B2 * | 6/2011 | Williams | 324/762.09 |
| 8,159,204 | B2 * | 4/2012 | Grant | 323/285 |
| 2010/0134091 | A1 * | 6/2010 | Eom et al. | 324/76.11 |

FOREIGN PATENT DOCUMENTS

WO 2005/091482 9/2005

\* cited by examiner

*Primary Examiner* — Jared Fureman
*Assistant Examiner* — Nicholas Ieva
(74) *Attorney, Agent, or Firm* — Fish & Richardson P.C.

(57) ABSTRACT

A ground protection circuit (36) includes: a sensing resistor (R3), disposed on a path which a charging current (IB) of a bootstrap circuit (D1, C1) flows through; a comparator (361), for comparing a voltage ($\Delta V$) between two ends of the sensing resistor (R3) and a specific threshold voltage (Vth) to generate a ground protection signal (S1); and a logic gate (362), for enabling the ground protection signal (S1) to be invalid in a normal charging operation of the bootstrap circuit.

6 Claims, 5 Drawing Sheets

PRIORT ART

GROUND PROTECTION CIRCUIT AND SWITCH DRIVING DEVICE USING THE SAME

BACKGROUND OF THE INVENTION

1. Field of the Invention

The present invention relates to a ground protection circuit and a switch driving device using the same.

2. Description of the Related Art

FIG. 9 is a diagram showing a conventional switch driving device having a ground protection circuit. The conventional switch driving device is a semiconductor integrated circuit device which controls a driving current I of a load by performing on/off control on a switch SW. In the switch driving device, when a connection end of the load is grounded (the grounding end or a low potential end equivalent to the grounding end is short-circuited), the driving current I is turned into an overcurrent state and the switch SW or load can be damaged. Therefore, the conventional switch driving device has a ground protection circuit, so as to monitor a voltage $\Delta V$ between two ends of a sensing resistor Rs mounted on a current path of the driving current I, and to compulsorily switch off the switch SW when the voltage $\Delta V$ between the two ends is greater than a specific threshold voltage Vth.

Additionally, a patent document 1 used as an example of the foregoing associated prior art can be listed.

DOCUMENT IN THE PRIOR ART

Patent Document

[Patent document 1] specification of WO 2005/091482

SUMMARY OF THE INVENTION

Problems to be Solved by the Invention

However, the following problems occur in the conventional switch driving device, that is, in order to implement a ground protection circuit, a sensing resistor Rs must be mounted on a current path of the driving current I, so that the number of parts is increased or the output efficiency is reduced. Moreover, in a switch driving device (such as, a motor driver of a large home appliance) applied with a high voltage HV (hundreds of volts), an expensive high-watt corresponding element must be used as the sensing resistor Rs, and therefore a problem that the set cost is increased exists. Moreover, in a situation that the conventional switch driving device is implemented with a single-chip integrated circuit (IC), a comparator for monitoring the voltage between two ends of the sensing resistor Rs must be formed with a high voltage-resistant element, so that problems that the chip area is increased so as to increase the set cost occur. Due to the above reasons, a practical case is caused that a switch driving device carried on a set (such as, a large home appliance) considering the cost or output efficiency to be preferential comes to a halt in an aspect of mounting a ground protection circuit.

The objective of the present invention lies in that, in view of the foregoing problems found by the inventor of this application, a ground protection circuit which can perform proper ground protection without increasing the cost or reducing the output efficiency, and a switch driving device using the same are provided.

Technical Means for Solving the Problems

In order to achieve the foregoing objective, a ground protection circuit according to the present invention (a first configuration) includes: a sensing resistor, disposed on a path of a charging current of a bootstrap circuit; a comparator, for comparing a voltage between two ends of the sensing resistor and a specific threshold voltage to generate a ground protection signal; and a logic gate, for enabling the ground protection signal to be invalid in a normal charging operation of the bootstrap circuit.

Additionally, the ground protection circuit including the foregoing configuration can also be the following configuration (a second configuration), that is, the sensing resistor is concurrently used as a limiting resistor of the charging current of the bootstrap circuit.

Moreover, the ground protection circuit including the foregoing first or second configuration can also be the following configuration (a third configuration), that is, the sensing resistor is implemented by using an on-resistance of a transistor.

Moreover, a switch driving device according to the present invention (a fourth configuration) includes: a driver, for generating an output signal corresponding to an input signal and supplying the output signal to a switch; a bootstrap circuit, for generating a driving voltage of the driver; a ground protection circuit, including the foregoing first to second configurations; and a controller, for controlling driving of the switch based on the ground protection signal.

Additionally, the switch driving device including the foregoing fourth configuration can also be the following configuration (a fifth configuration), that is, the bootstrap circuit includes: a diode, having an anode connected to an applying end of a power supply voltage; and a capacitor, connected between a cathode of the diode and an end of the switch, and outputting the driving voltage of the driver from a connection node of the diode and the capacitor.

Moreover, the switch driving device including the foregoing fourth or fifth configuration is a configuration (a sixth configuration) which drives the switch to control a motor current.

Moreover, the switch driving device including the foregoing fourth or fifth configuration is a configuration (a seventh configuration) which drives the switch to generate an expected output voltage according to an input voltage.

Effects of the Invention

According to the present invention, a ground protection circuit which can perform proper ground protection without increasing the cost or reducing the output efficiency and a switch driving device using the same are provided.

PREFERRED EMBODIMENT OF THE INVENTION

First Embodiment

Figure 1:
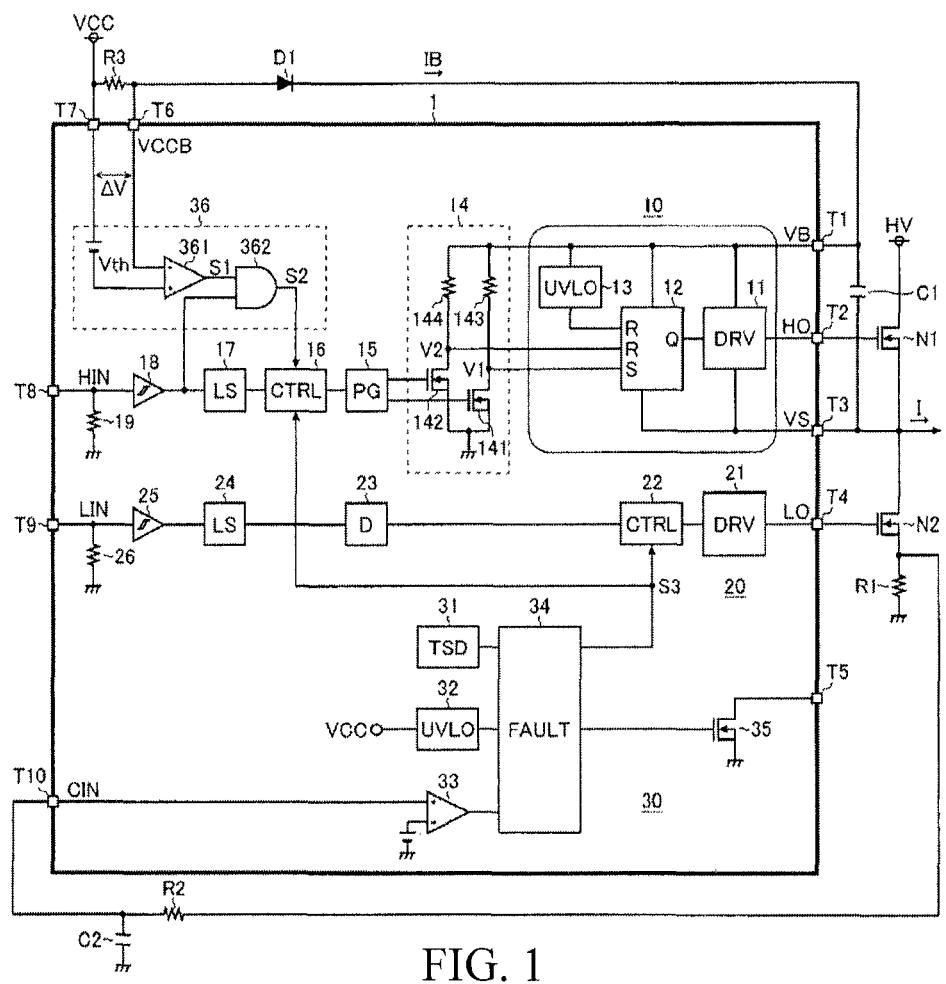
FIG. 1 is a block diagram showing a switch driving device according to a first embodiment of the present invention.

FIG. 1 is a block diagram showing a switch driving device according to a first embodiment of the present invention. A switch driving device 1 of the first embodiment is a single-chip semiconductor integrated circuit device including an upper switch driving portion 10, a lower switch driving portion 20 and a fault protection portion 30. The switch driving device 1 controls a driving current I of a load (not shown) by controlling the on/off of N channel metal oxide semiconductor (MOS) field effect transistors N1 and N2 connected to the outside of the switch driving device 1.

The switch driving device 1 includes external terminals T1 to T10 so as to determine the electrical connection to the outside of the device. In addition to being connected to the transistors N1 and N2 used as on/off control objects, the outside of the switch driving device 1 is further connected to resistors R1 to R3, capacitors C1 and C2, and a diode D1.

At the outside of the switch driving device 1, the drain of the transistor N1 is connected to an applying end of a high voltage HV (hundreds of volts). The source and the back gate of the transistor N1 are connected to an external terminal T3 (switch terminal). The gate of the transistor N1 is connected to an external terminal T2 (upper gate terminal). The drain of the transistor N2 is connected to the external terminal T3. The source and the back gate of the transistor N2 are connected to a grounding end through the resistor R1, and are also connected to a first end of the resistor R2. A second end of the resistor R2 is connected to an external terminal T10 (power supply fault detection terminal), and is also connected to the grounding end through the capacitor C2. The gate of the transistor N2 is connected to an external terminal T4 (lower gate terminal). The first end of the capacitor C1 is connected to the external terminal T1 (step-up terminal). The second end of the capacitor C1 is connected to the external terminal T3. The anode of the diode D1 is connected to the applying end of the power supply voltage VCC through the resistor R3. The cathode of the diode D1 is connected to the external terminal T1. The first end (high potential end) of the resistor R3 is connected to the external terminal T7 (current detection terminal (+)). The second end (low potential end) of the resistor R3 is connected to the external terminal to T6 (current detection terminal (−)).

The upper switch driving portion 10 includes a driver 11, an RS flip-flop 12, a step-down protection circuit (under voltage lock out (UVLO) circuit for VB monitoring) 13, a level converter 14, a pulse generator 15, a controller 16, a level converter 17, a Schmitt trigger 18 and a resistor 19.

The driver 11 outputs an upper output signal HO to the external terminal T2 based on an output signal of the RS flip-flop 12. Additionally, the high level of the upper output signal HO becomes a step-up voltage VB, and the low level of the upper output signal HO becomes a switch voltage VS.

The RS flip-flop 12 uses the descendent edge of the setting signal V1 input from the level converter 14 to a setting end (S) as a trigger to set the output signal to a high level, and uses the descendent edge of the resetting signal V2 input from the level converter 14 to a first resetting end (R) (or the descendent edge of a step-down protection signal input from the step-down protection circuit 13 to a second resetting end (R)) as a trigger to reset the output signal to a low level.

When the step-up voltage VB is lower than a specific threshold voltage, the step-down protection circuit 13 switches the step-down protection signal from a logic level (such as, high level) during normality to a logic level (such as, low level) during a fault.

Additionally, the driver 11, the RS flip-flop 12, and the step-down protection circuit 13 belong to high potential blocks which are operated between the step-up voltage VB applied to the external terminal T1 and the switch voltage VS applied to the external terminal T3 (referring to a round cornered square frame in FIG. 1), and other circuit blocks all belong to low potential blocks.

The level converter 14 is a circuit block enabling a signal to be subject to level conversion and to be transferred from the low potential block to the high potential block, and includes N channel double-diffused MOS (DMOS) field effect transistors 141 and 142, and resistors 143 and 144. The sources of and the back gates of both the transistors 141 and 142 are connected to the grounding end. The drain of the transistor 141 is connected to the setting end (S) of the RS flip-flop 12, and is also connected to the external terminal T1 through the resistor 143. The drain of the transistor 142 is connected to the resetting end (R) of the RS flip-flop 12, and is also connected to the external terminal T1 through the resistor 144. The gates of the transistors 141 and 142 are respectively connected to the pulse generator 15. Additionally, Compared with the transistors forming the low potential block, the transistors 141 and 142 forming the level converter 14 are both designed to be high voltage-resistant (such as, 600 V voltage-resistant).

The pulse generator 15 generates gate signals of the transistors 141 and 142 based on the output signal of the controller 16. Specifically, the pulse generator 15 uses the ascendant edge of the output signal of the controller 16 as a trigger to enable a gate signal of the transistor 141 to be at a high level only during a specific on period, and uses the descendent edge of the output signal of the controller 16 as a trigger to enable a gate signal of the transistor 142 to be at a high level only during a specific on period.

The controller 16 controls whether the output signal of the level converter 17 is transferred to the pulse generator 15 (and then whether the transistor N1 is driven) based on a shielded ground protection signal S2 from a ground protection circuit 36, or a fault signal S3 from a fault signal generation circuit 34.

The level converter 17 performs level conversion on the output signal of the Schmitt trigger 18, converts it into a voltage level (VCC-GND) appropriately input to the controller 16 and outputs the voltage level.

The Schmitt trigger 18 transfers an upper input signal HIN input to the external terminal T8 to the level converter 17. Additionally, the threshold voltage of the Schmitt trigger 18 is endowed with specific delay. Through the configuration, tolerance to noise can be improved.

The resistor 19 pulls the external terminal T8 down to the grounding end. Therefore, in a situation that the external terminal T8 is in an open state, the upper input signal HIN is turned into a low level (logic level used to enable the transistor N1 to be off), and therefore the transistor N1 is not switched on unexpectedly.

The lower switch driving portion 20 includes a driver 21, a controller 22, a delay portion 23, a level converter 24, a Schmitt trigger 25 and a resistor 26.

The driver 21 outputs a lower output signal LO to the external terminal T4 based on an output signal of the controller 22. Additionally, the high level of the lower output signal LO becomes the power supply voltage VCC, and the low level of the lower output signal LO becomes the ground voltage GND.

The controller 22 controls whether the output signal of the delay portion 23 is transferred to the driver 21 (and then whether the transistor N2 is driven) based on a fault signal S3 from the fault signal generation circuit 34.

The delay portion 23 endows the output signal of the level converter 24 with specific delay (equivalent to the circuit delay generated by the pulse generator 15, the level converter 14, and the RS flip-flop 12 of the upper switch driving portion 10) and transfers the output signal to the controller 22.

The level converter 24 performs level conversion on the output signal of the Schmitt trigger 25, converts it into a voltage level (VCC-GND) appropriately input to the controller 22 and outputs the voltage level.

The Schmitt trigger 25 transfers a lower input signal LIN input to the external terminal T9 to the level converter 24. Additionally, the threshold voltage of the Schmitt trigger 25 is endowed with specific delay. Through the configuration, tolerance to noise can be improved.

The resistor 26 pulls the external terminal T9 down to the grounding end. Therefore, in a situation that the external terminal T9 is in an open state, the lower input signal LIN is turned into a low level (logic level used to enable the transistor N2 to be off), and therefore the transistor N2 is not switched on unexpectedly.

The fault protection portion 30 includes a temperature protection circuit (thermal shut down (TSD) circuit) 31, a step-down protection circuit (UVLO circuit for VCC monitoring) 32, a power supply fault protection circuit 33, a fault signal generation circuit 34, an N channel MOS field effect transistor 35, and a ground protection circuit 36.

When the junction temperature of the switch driving device 1 is higher than a specific threshold temperature, the temperature protection circuit 31 switches the temperature protection signal from a logic level (such as, low level) during normality to a logic level (such as, high level) during a fault.

When the power supply voltage VCC is lower than a specific threshold voltage, the step-down protection circuit 32 switches the step-down protection signal from a logic level (such as, low level) during normality to a logic level (such as, high level) during a fault.

When the power supply fault detection voltage CIN (equivalent to the switch voltage VS smoothed through the resistor R2 and the capacitor C2) input to the external terminal T10 is higher than a specific threshold voltage, the power supply fault protection circuit 33 switches the power supply fault protection signal from a logic level (such as, low level) during normality to a logic level (such as, high level) during a fault. Additionally, the "power supply fault" refers to a state in which the external terminal T3 is short-circuited at an applying end of a high voltage HV (or a high potential end equivalent to this applying end).

The fault signal generation circuit 34 respectively monitors the temperature protection signal input from temperature protection circuit 31, the step-down protection signal input from the step-down protection circuit 32, and the power supply fault protection signal input from the power supply fault protection circuit 33, and in a situation that any of the above signals is failed, switches the fault signal S3 from a logic level (such as, low level) during normality to a logic level (such as, high level) during a fault.

The transistor 35 forms an open-drain output segment used to output an external fault signal from the external terminal T5. In a situation that the switch driving device 1 is not failed, the transistor 35 is switched off through the fault signal generation circuit 34, so that the external fault signal is at a high level. In another aspect, if some faults are generated in the switch driving device 1, the transistor 35 is switched on through the fault signal generation circuit 34, so that the external fault signal is at a low level.

The ground protection circuit 36 includes a comparator 361 and an AND gate 362, and when the voltage ΔV between two ends of the resistor R3 is greater than a specific threshold voltage, the ground protection circuit 36 switches the ground protection signal S1 from a logic level (such as, low level) during normality to a logic level (such as, high level) during a fault. Additionally, the "grounding" refers to a state in which the external terminal T3 is short-circuited at the grounding end (or a low potential end equivalent to this grounding end). The non-reverse input end (+) of the comparator 361 is connected to the external terminal T7 through a direct current voltage source. The reverse input end (−) of the comparator 361 is connected to the external terminal T6. The first input end of the AND gate 362 is connected to the output end of the comparator 361. The second input end of the AND gate 362 is connected to the output end of the Schmitt trigger 18. The output end of the AND gate 362 is connected to the controller 16.

<Bootstrap Circuit>

The switch driving device 1 including the foregoing configuration has a bootstrap circuit which is used as a mechanism for generating the step-up voltage VB (including driving voltages of high potential blocks such as the driver 11). The bootstrap circuit includes a diode D1 whose anode is connected to the applying end of the power supply voltage VCC, and a capacitor C1 connected between the cathode of the diode D1 and the source of the transistor N1, and outputs the step-up voltage VB from the connection node (the external terminal T1) of the diode D1 and the capacitor C1.

When the switch voltage VS presented at the external terminal T3 is at a low level (GND) by enabling the transistor N1 to be off and enabling the transistor N2 to be on, the current IB flows through a path from the applying end of the power supply voltage VCC to the diode D1, the capacitor C1, and the transistor N2, the capacitor C1 connected between the external terminal T1 and the external terminal T2 is charged. In this case, the step-up voltage VB presented at the external terminal T1 (that is, the charging voltage of the capacitor C1) becomes a voltage value obtained by subtracting the forward voltage drop Vf of the diode D1 from the power supply voltage VCC (=VCC−Vf).

In another aspect, under a state that the capacitor C1 is charged, the transistor N1 is switched on and the transistor N2 is switched off, and when the switch voltage VS is increased from the low level (GND) to the high level (HV), the step-up voltage VB is increased to a voltage value (=HV+(VCC−Vf)) higher than the high level (HV) of the switch voltage VS by the charging voltage (VCC-Vf) of the capacitor C1. Therefore, by supplying the step-up voltage VB as the driving voltage of the high potential blocks (the driver 11, the RS flip-flop 12, and the step-down protection circuit 13) or the level converter 14, the on/off control (particularly, the on control) can be performed on the N channel MOS field effect transistor N1.

<Upper Switch Driving Operation>

Figure 2:
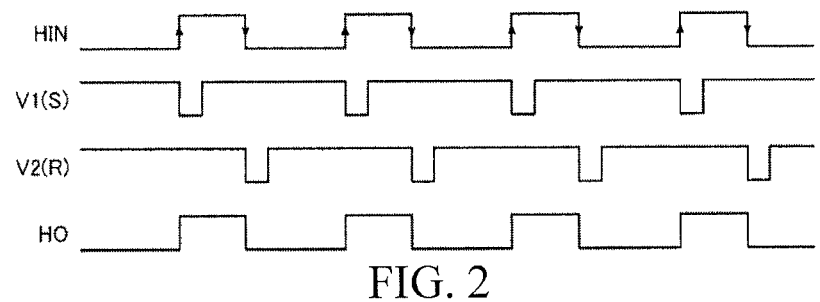
FIG. 2 is a timing diagram illustrating an upper switch driving operation.

FIG. 2 is a timing diagram illustrating an upper switch driving operation, in which an upper input signal HIN, a setting signal V1 (S), a resetting signal V2 (R), and an upper output signal HO are described sequentially from the upper side. Additionally, in FIG. 2, in order to simplify the illustration, the description about a case that the high level potential of the setting signal V1 (S) or resetting signal V2 (R) changes with a bootstrap operation is omitted.

When the upper input signal HIN is increased from a low level to a high level, the ascendant edge thereof is used as a trigger so as to enable the gate signal of the transistor 141 to be turned into a high level only during a specific on period. When the transistor 141 is switched on and the setting signal V1 is decreased from the high level to the low level, the descendent edge thereof is used as a trigger so as to set the upper output signal HO to a high level.

In another aspect, when the upper input signal HIN is decreased from a high level to a low level, the descendant edge thereof is used as a trigger so as to enable the gate signal of the transistor 142 to be turned into a high level only during a specific on period. When the transistor 142 is switched on and the resetting signal V2 is decreased from the high level to the low level, the descendent edge thereof is used as a trigger so as to set the upper output signal HO to a low level.

Through the foregoing operation, the upper output signal HO at the same logic level with that of the upper input signal HIN is generated in the upper switch driving portion 10 to perform the on/off control on the transistor N1. Additionally, the power consumed by the level converter 14 can be constrained by shortening the on period of the transistors 141 and 142.

<Ground Protection Operation>

Figure 3:
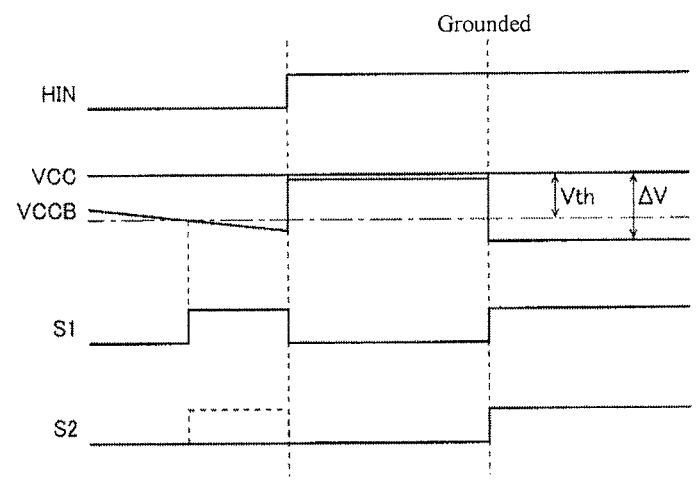
FIG. 3 is a timing diagram illustrating a ground protection operation.

FIG. 3 is a timing diagram illustrating a ground protection operation, in which an upper input signal HIN, a power supply voltage VCC, a current detection voltage VCCB, a ground protection signal S1, and a shielded ground protection signal S2 are sequentially described from the upper side.

The external terminal T3 is grounded and a large current flows through the external terminal T3 at the time when the transistor N1 is switched on, that is, when the upper input signal HIN is turned into a high level (a logic level used to enable the transistor N1 to be on).

In a situation that the external terminal T3 is not grounded, and under a state that the upper transistor N1 is switched on, the switch voltage VS is turned into a high level (HV), and therefore the capacitor C1 of the bootstrap circuit is not charged, and currents are only supplied to high potential blocks including the driver 11 to enable the capacitor C1 to be discharged. That is, in a situation that the external terminal T3 is not grounded, and under a state that the upper transistor N1 is switched on, the current IB does not flow through the resistor R3 disposed on the path of the charging current of the bootstrap circuit, and thereby, no voltage drop is generated between two ends of the resistor R3.

In another aspect, in a situation that the external terminal T3 is grounded, even if it is under a state that the upper transistor N1 is switched on, the switch voltage VS is also decreased to the low level (GND), and therefore the current IB flows through a path from the applying end of the power supply voltage VCC to the resistor R3, the diode D1, and the capacitor C1, thereby generating voltage drop between two ends of the resistor R3.

Therefore, the ground protection circuit 36 becomes the following configuration, that is, the comparator 361 and the AND gate 362 are used during the high level of the upper input signal HIN (other than the normal charging period of the capacitor C1) to monitor whether voltage drop is generated between two ends of the resistor R3, thereby detecting whether the external terminal T3 is grounded.

The comparator 361 compares the voltage ΔV between two ends of the resistor R3 (=VCC−VCCB) and a specific threshold voltage Vth to generate a ground protection signal S1. Additionally, when the current IB larger than the specific value flows through the resistor R3 so as to enable the voltage ΔV between two ends of the resistor R3 to be greater than the specific threshold voltage Vth, the ground protection signal S1 is switched from a low level (logic level during normality) to a high level (logic level during a fault).

The AND gate 362 generates a logic product signal of the ground protection signal S1 and the upper input signal HIN, and uses this signal as the shielded ground protection signal S2 to be output to the controller 16. Therefore, during the low level period of the upper input signal HIN (the normal charging period of the capacitor C1), the shielded ground protection signal S2 can be maintained at a low level (logic level during normality) independent of the logic level of the ground protection signal S1. In another aspect, during the high level period of the upper input signal HIN (other than the normal charging period of the capacitor C1), the ground protection signal S1 is used as the shielded ground protection signal S2 to be directly output. By use of the AND gate 362, during the low level period of the upper input signal HIN (the normal charging period of the capacitor C1), the ground protection signal S1 can be made invalid, and therefore, only the high level period of the upper input signal IN (other than the normal charging period of the capacitor C1) can be set to the monitoring period of the current IB.

According to the foregoing the ground protection circuit 36, the resistor R3 used as the sensing resistor can implement proper ground protection without using any expensive high watt corresponding element. Moreover, if the foregoing the ground protection circuit 36 is used, it is unnecessary to insert a sensing resistor on the path which the driving current I of the load flows through, and therefore the output efficiency is not reduced. Moreover, if the foregoing the ground protection circuit 36 is used, it is unnecessary to form the comparator 361 or the AND gate 362 with high voltage-resistant elements, and therefore the chip area is not unnecessarily increased. In this way, if the foregoing the ground protection circuit 36 is used, the ground protection circuit 36 can also be preferably mounted into the switch driving device 1 carried on a set (such as, a large home appliance) considering the cost or output efficiency to be preferential; and therefore the set reliability can be greatly improved.

Additionally, the resistor R3 is not only used as the sensing resistor of the ground protection circuit 36, but also concurrently used as a limiting resistor of the charging current of the bootstrap circuit. Through the configuration, the ground protection circuit 36 can be mounted into the switch driving device 1 without excessively increasing the number of parts.

Second Embodiment

Figure 4:
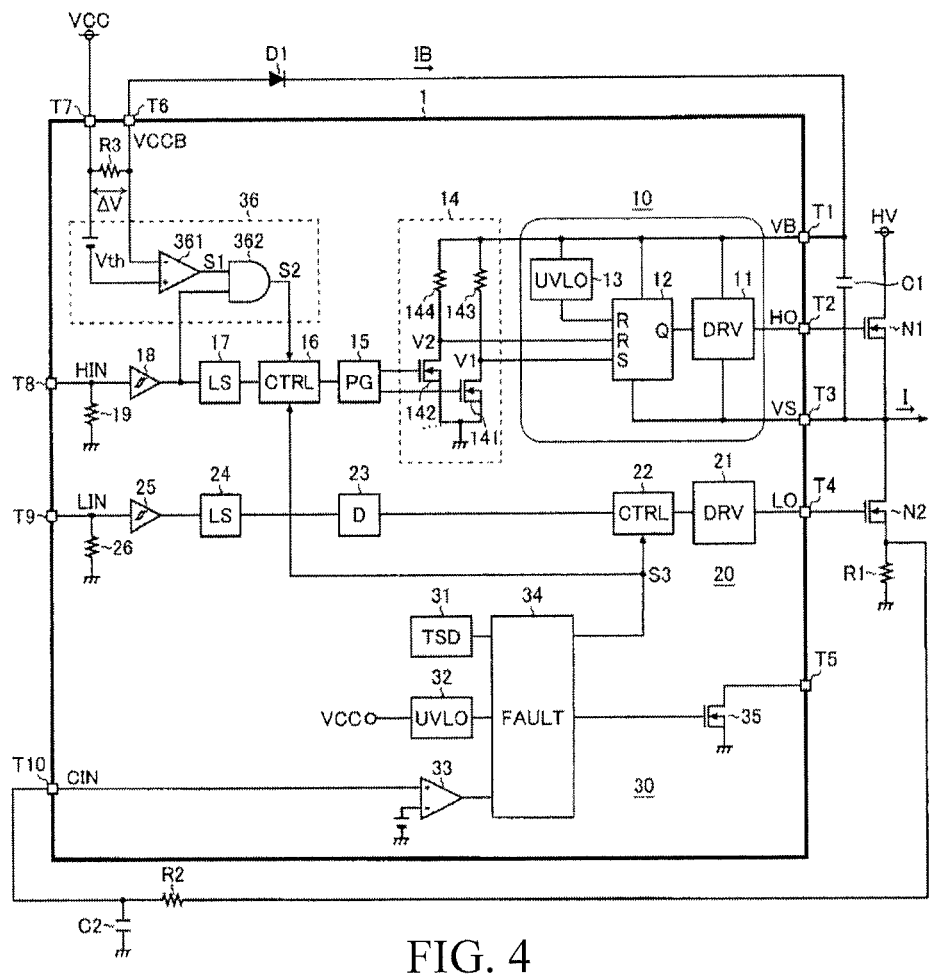
FIG. 4 is a block diagram showing a switch driving device according to a second embodiment of the present invention.

FIG. 4 is a block diagram showing a switch driving device according to a second embodiment of the present invention. The switch driving device 1 of the second embodiment is of the substantially same configuration with that of the first embodiment, and is characterized by that the resistor R3 is built in. Through the configuration, the number of external discrete parts can be reduced, thereby facilitating the cost reduction or miniature of the set.

Figure 5:
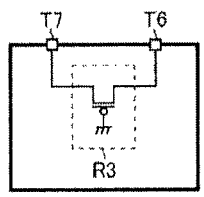
FIG. 5 is a circuit diagram showing a configuration example of a resistor R3.

FIG. 5 is a circuit diagram showing a configuration example of a resistor R3. As shown in the configuration example, the resistor R3 can be implemented by using the on-resistance of a P channel MOS field effect transistor. Through the configuration, the resistance value of the resistor R3 built in the switch driving device 1 can be sufficiently high, and therefore, like the situation that the resistor R3 is built out, the resistor R3 can not only be used as the sensing resistor, but also can be concurrently used as the limiting resistor of the charging current IB.

<Application Example of Switch Driving Device>

Figure 6:
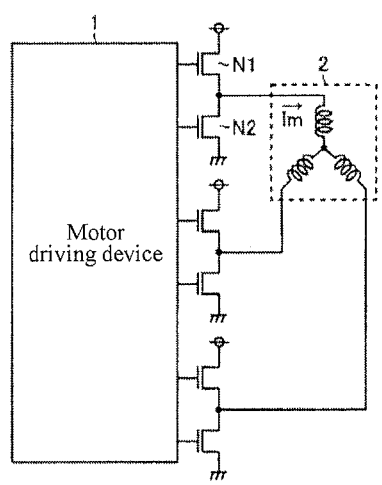
FIG. 6 is a diagram showing a first application example of a switch driving device 1.

FIG. 6 is a diagram showing a first application example of a switch driving device 1. As shown in FIG. 6, the switch driving device 1 can be applied as a motor driving device for driving transistors N1 and N2 to control a driving current Im of a motor 2 (such as, a compressor motor or fan motor for a large home appliance). Additionally, in FIG. 6, a three-phase alternating current motor used as the motor 2 is exemplarily shown, but the driven object of the switch driving device 1 is not limited to this, and a two-phase alternating current motor or direct current motor can also be used as a driven object.

Figure 7:
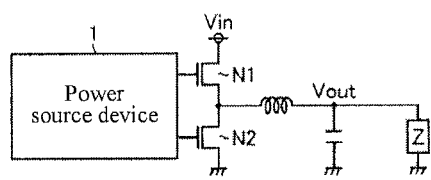
FIG. 7 is a diagram showing a second application example of a switch driving device 1.

FIG. 7 is a diagram showing a second application example of a switch driving device 1. As shown in FIG. 7, the switch driving device 1 can also be applied as a synchronous rectifying switch power supply device for auxiliarily (exclusively) driving the transistors N1 and N2 to generate an expected output voltage Vout according to an input voltage Vin. Additionally, the foregoing term of "auxiliarily (exclusively)", in addition to including the situation that the transistors N1 and N2 are switched on/off completely contrarily, further includes the situation that the transistors N1 and N2 are set to off simultaneously by taking prevention of the through current into account.

Figure 8:
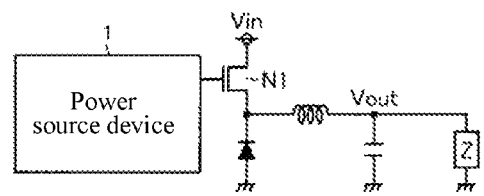
FIG. 8 is a diagram showing a third application example of a switch driving device 1.
Figure 9:
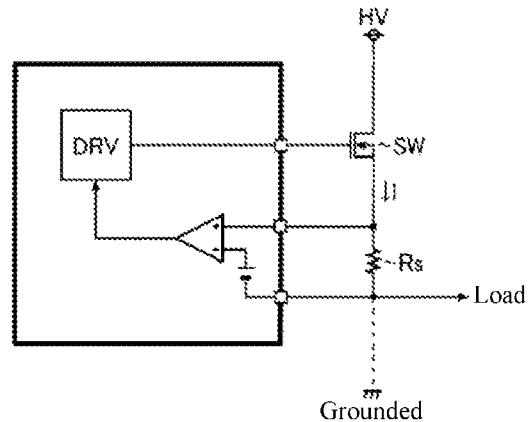
FIG. 9 is a diagram showing a conventional switch driving device having a ground protection circuit.

FIG. 8 is a diagram showing a third application example of a switch driving device 1. As shown in FIG. 8, the switch driving device 1 can also be applied as an asynchronous rectifying switch power supply device for driving the transistor N1 to generate an expected output voltage Vout according to an input voltage Vin.

Other Variation Examples

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. All such modifications are intended to be within the scope of the claims appended hereto.

The ground protection circuit according to the present invention can be preferably used as a ground protection mechanism of a motor driver for a large home appliance.

What is claimed is:

1. A switch driving device, comprising:
   a driver, for generating an output signal corresponding to an input signal and supplying the output signal to a switch;
   a bootstrap circuit, for generating a driving voltage of the driver;
   a ground protection circuit; and
   a controller, for controlling driving of the switch based on a ground protection signal generated by the ground protection circuit,
   wherein the bootstrap circuit comprises:
      a diode, having an anode connected to an applying end of a power supply voltage; and
      a capacitor, having a first end connected to a cathode of the diode and a second end connected to an output end of the switch;
      and wherein the bootstrap circuit outputs the driving voltage of the driver from a connection node of the diode and the capacitor; and
   wherein the ground protection circuit comprises:
      a sensing resistor, disposed on the anode side of the diode;
      a comparator, for comparing a voltage between two ends of the sensing resistor and a specific non-zero threshold voltage to generate the ground protection signal; and
      a logic gate, for enabling the ground protection signal to be invalid in a normal charging operation of the bootstrap circuit.

2. The switch driving device according to claim 1, wherein the sensing resistor is concurrently used as a limiting resistor of a charging current of the bootstrap circuit.

3. The switch driving device according to claim 1, wherein the sensing resistor is implemented by using an on-resistance of a transistor.

4. The switch driving device according to claim 2, wherein the sensing resistor is implemented by using an on-resistance of a transistor.

5. The switch driving device according to claim 1, wherein the switch driving device drives the switch to control a motor current.

6. The switch driving device according to claim 1, wherein the switch driving device drives the switch to generate an expected output voltage according to an input voltage.

* * * * *